US010585669B2

(12) United States Patent
Ogasawara

(10) Patent No.: US 10,585,669 B2
(45) Date of Patent: Mar. 10, 2020

(54) REDUCING STALLING IN A SIMULTANEOUS MULTITHREADING PROCESSOR BY INSERTING THREAD SWITCHES FOR INSTRUCTIONS LIKELY TO STALL

(71) Applicant: International Business Machines Corporation, Armonk, NY (US)

(72) Inventor: Takeshi Ogasawara, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 16/049,929

(22) Filed: Jul. 31, 2018

(65) Prior Publication Data

US 2018/0336030 A1 Nov. 22, 2018

Related U.S. Application Data

(62) Division of application No. 13/965,562, filed on Aug. 13, 2013, now Pat. No. 10,114,645.

(30) Foreign Application Priority Data

Aug. 13, 2012 (JP) .................................. 2012-179345

(51) Int. Cl.
G06F 8/41 (2018.01)
G06F 9/30 (2018.01)
G06F 9/38 (2018.01)

(52) U.S. Cl.
CPC ........ *G06F 9/30079* (2013.01); *G06F 8/4451* (2013.01); *G06F 9/3009* (2013.01); *G06F 9/3838* (2013.01); *G06F 9/3851* (2013.01)

(58) Field of Classification Search
CPC ..................................................... G06F 8/4451
See application file for complete search history.

(56) References Cited

U.S. PATENT DOCUMENTS 6,026,479 A * 2/2000 Fisher ................. G06F 9/30076
712/215
7,539,979 B1 * 5/2009 Nir-Buchbinder ...... G06F 9/461
714/35

(Continued)

FOREIGN PATENT DOCUMENTS

JP 08-147165 6/1996

OTHER PUBLICATIONS

Non-Final Office Action for U.S. Appl. No. 13/965,562 dated Jul. 12, 2016.

(Continued)

*Primary Examiner* — Jacob Petranek
(74) *Attorney, Agent, or Firm* — Fleit Intellectual Property Law; Jon Gibbons

(57) ABSTRACT

A system and method suppresses occurrence of stalling caused by data dependency other than register dependency in an out-of-order processor. A stall reducing method includes a handler for detecting a stall occurring during execution of execution code using a performance monitoring unit, and for identifying, based on dependencies, a second instruction on which a first instruction is data dependent, the stall based on this dependency. A profiler registers the second instruction as profile information. An optimization module inserts a thread yield instruction in an appropriate position inside execution code or an original code file based on the profile information, and outputs optimized execution code.

5 Claims, 8 Drawing Sheets

(56) References Cited

U.S. PATENT DOCUMENTS

| | | |
|---|---|---|
| 7,865,702 B2 | 1/2011 | Suba |
| 2002/0091915 A1 | 7/2002 | Parady |
| 2003/0208665 A1 | 11/2003 | Peir et al. |
| 2003/0233521 A1 | 12/2003 | Pudipeddi et al. |
| 2006/0179280 A1 | 8/2006 | Jensen et al. |
| 2007/0143580 A1 | 6/2007 | Musoll et al. |
| 2007/0214342 A1* | 9/2007 | Newburn ............ G06F 11/348 712/216 |
| 2008/0133897 A1* | 6/2008 | Reid ................... G06F 11/362 712/227 |
| 2008/0263325 A1 | 10/2008 | Kudva et al. |
| 2008/0263341 A1 | 10/2008 | Ozer et al. |
| 2010/0017582 A1 | 1/2010 | Suba |
| 2010/0017852 A1 | 1/2010 | Guillot et al. |
| 2012/0284463 A1 | 11/2012 | Srinivasan et al. |
| 2014/0006717 A1 | 1/2014 | Steely, Jr. et al. |
| 2015/0026438 A1* | 1/2015 | Giroux ................. G06F 9/38 712/225 |

OTHER PUBLICATIONS

Final Office Action for U.S. Appl. No. 13/965,562 dated Nov. 8, 2016.

\* cited by examiner

REDUCING STALLING IN A SIMULTANEOUS MULTITHREADING PROCESSOR BY INSERTING THREAD SWITCHES FOR INSTRUCTIONS LIKELY TO STALL

CROSS-REFERENCE TO RELATED APPLICATION

This application is based upon and claims priority from prior Japanese patent application number 2012-179345, filed Aug. 13, 2012, the entire disclosure of which is hereby incorporated by reference herein.

BACKGROUND OF THE INVENTION

Field of the Invention

The present invention relates to a technique for reducing occurrence of stalling in a pipeline, which may be observed in a processor performing out-of-order execution. More specifically, the present invention relates to a technique for reducing the occurrence of stalling during simultaneous execution of a plurality of threads in a simultaneous multithreading (SMT) technique.

Description of the Related Art

Many high-performance processors use out-of-order execution to improve instruction execution efficiency. In out-of-order execution, the instructions are processed in data order, that is, the order prepared in a register of the processor by operands and not data. An out-of-order processor modifies the order of the execution results afterwards, so same results are obtained as when the instructions are executed in order.

However, even an out-of-order processor sometimes executes instructions in an order which damages data dependencies and the processing stalls. The cause is hardware constraints on checking data dependencies which is an upper limit on an instruction window, and there is an upper limit on the complexity of dependencies that can be processed at high speeds. These problems can be reduced by using software to optimize the code, but data dependencies are naturally difficult to analyze across functions and across elements when operated using a large number of software element combinations.

There are many prior art techniques for solving the problem of stalls in a pipeline. U.S. Patent Application Publication No. 2010/0017582 discloses a technique in which a simultaneous multithreading processor synchronizes thread selection priorities for selecting thread instructions between a plurality of determination points in a plurality of pipelines inside a processor, thereby improving the performance of the overall system and reducing power consumption.

U.S. Patent Application Publication No. 2008/0263325 discloses a technique in which a long-latency instruction is identified in a first thread analysis as an instruction which may cause a pipeline stall, and the long latency is hidden by inserting a thread-switching instruction after the identified instruction has been executed.

U.S. Patent Application Publication No. 2006/0179280 discloses a technique in which a simultaneous multithreading processor calculates the data dependencies for the instructions from each thread, determines an execution priority for each instruction, and selects the instructions to be dispatched based on the determined execution priorities in order to perform stall-free execution of instructions.

Japanese Laid-open Patent Publication No. 8-147165 discloses a technique in which a processor supporting multiple contexts simultaneously executes a plurality of contexts by executing the instructions in the context of the pipeline and switches to another context during execution when an empty pipeline has been detected. More specifically, Japanese Laid-open Patent Publication No. 8-147165 discloses a technique in which attribute information calling for an instruction fetch from another context during execution of each instruction is provided in an attribute information field of a preceding instruction code having a latency interval with the respective instructions as information required to execute loading instructions and branching instructions during an opportunity for context switching.

The technique disclosed in U.S. Patent Application Publication No. 2010/0017582 is able to suppress the execution of threads likely to stall, and can improve CPU execution efficiency by executing instructions in other threads. However, this technique cannot suppress stalls caused by the execution of instructions in an order which damages data dependencies. The techniques disclosed in U.S. Patent Application Publication No. 2008/0263325 and Japanese Laid-open Patent Publication No. 8-147165 are triggered by a thread and introduce an instruction from another thread in order to hide latencies in executed instructions. However, these techniques cannot actually suppress stalls.

The technique disclosed in U.S. Patent Application Publication No. 2008/0263325 can prevent stalls by calculating the data dependencies of an instruction and not introducing the instruction before the input value has been calculated. However, in U.S. Patent Application Publication No. 2008/0263325, an instruction inserted into the pipeline that cannot be executed is determined based on the register dependencies of the instruction. As a result, stalls caused by data dependencies other than register dependencies cannot be suppressed.

SUMMARY OF THE INVENTION

A purpose of the present invention is to solve this problem by providing a technique for suppressing the occurrence of stalling caused by data dependency other than register dependency in an out-of-order processor.

In order to solve this problem, the present inventor came up with the idea of identifying a data-dependent stalled instruction based on dependencies when an initial stall occurs, and subsequently inserting an instruction to fetch a thread other than the thread being executed for subsequent execution of the registered data-dependent instruction so that data is prepared in the period after a data-dependent instruction has been fetched and before the stalled instruction is fetched.

In order to achieve this purpose, the present invention provides a computer-executed method for reducing stalling in the pipeline of a processor having a simultaneous multithreading function. This method includes the steps of: detecting the occurrence of stalling; identifying, from data dependency, whether or not there is another instruction (second instruction) on which the stalled instruction (first instruction) is data dependent; registering the identified second instruction; and inserting an instruction instructing the fetching of other thread different from the thread being executed with respect to subsequent executions of the registered second instruction so the thread being executed is switched after the second instruction has been fetched and before the fetching of the first instruction.

The present invention was explained above as a method for reducing stalling in the pipeline of a processor having a simultaneous multithreading function. However, the present invention can also be understood as a stall reducing program which executes this method for reducing stalling in a computer. In addition, the present invention can be understood as a system embodying this method for reducing stalling.

In order to achieve this purpose, the present invention also provides a device for reducing stalling in the pipeline of a processor having a simultaneous multithreading function. This device includes a fetching unit for fetching, in accordance with the priority of a thread, an instruction from a buffer prepared for each thread; a decoding unit for decoding a fetched instruction; a dispatching unit for dispatching a decoded instruction; and a plurality of executing units able to execute a dispatched instruction and detect a thread. Each executing unit responds to the detection of stalling by identifying and registering, from data dependency, another instruction (second instruction) on which the instruction being executed (first instruction) is data dependent. The fetching unit determines whether or not a fetched instruction is a registered second instruction, and responds to a determined second instruction by switching the thread being executed until the first instruction has been fetched.

In the invention of the present application, an instruction on which a stalled instruction is data dependent is identified based on data dependencies and registered when the initial stall occurs, and an instruction is inserted for fetching a thread other than the thread being executed as the next registered data-dependent instruction to be executed. Thus, in the configuration of the invention of the present application, the thread being executed is switched after the data-dependent instruction has been fetched until the stalled instruction has been fetched. This can suppress the occurrence of stalling caused by data dependency other than register dependency in an out-of-order processor. Other effects of the present invention will become clear in the explanation of the embodiments.

DETAILED DESCRIPTION OF THE EMBODIMENTS

Preferred embodiments of the present invention will now be described in detail with reference to the drawings. However, the present invention as described in the scope of the claims is not limited to the following embodiments, and all combinations of features explained in the embodiments are not necessarily essential to the technical solution of the present invention. All identical configurational elements are denoted by the same reference signs throughout the entire description of the embodiments.

Figure 1A:
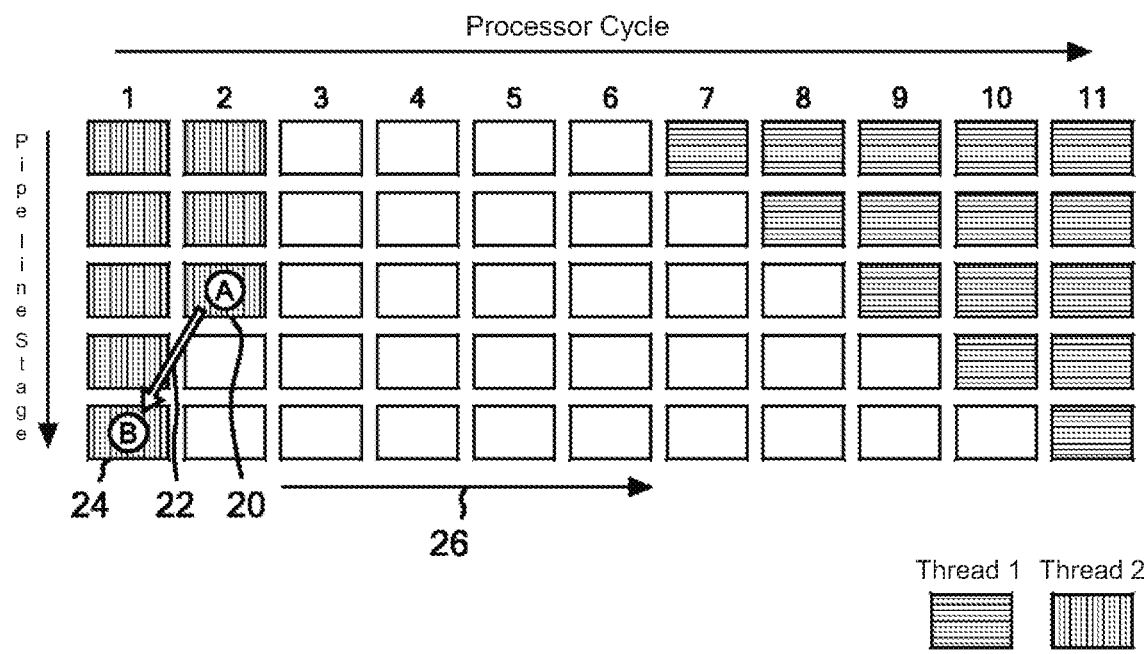
FIG. 1A is a diagram schematically illustrating the penalty of flushing when a pipeline stalls.

FIG. 1A is a diagram schematically illustrating the penalty of flushing when a pipeline stalls. In FIG. 1A, the horizontal axis denotes the processor cycles, and the vertical axis denotes each stage in the pipeline of the processor (the processing results of each stage are passed on to the next stage). The blocks with horizontal shading indicate the stages embedded in the instructions of thread 1, and the blocks with vertical shading indicate the stages embedded in the instructions of thread 2. It should be understood that, in FIG. 1A, the pipeline is indicated by only some of these blocks, and the final stage is not shown.

In FIG. 1A, a stall occurs while processing instruction A in the second cycle during the third stage 20 from the top. This is because, as indicated by arrow 22, the execution results of instruction B processed in the first cycle during the fifth stage 24 from the top are not yet available to instruction A processed in stage 20 of the second cycle. In this situation, the instruction is executed by the out-of-order processor in an order which damages the data dependencies.

As a result, in the example shown in FIG. 1A, a new instruction (see arrow 26) is not introduced between the stalled second cycle and the next cycle as a penalty, and all of the processing results from the earlier stages, including the stalled stage 20, are invalidated. When the pipeline cannot efficiently execute instructions because of such a stall, the performance of the processor declines. Therefore, frequent stalls are linked to a significant decrease in performance.

In the present invention, when the first stall occurs, the instructions on which the stalled instruction is dependent are identified and registered based on the data dependencies, and an instruction is inserted to fetch a thread other than the thread being executed for subsequent execution of data-dependent instructions. Because this configuration can switch the thread being executed any time after a data-dependent instruction has been fetched and before the stalled instruction has been fetched, a sufficient time interval is obtained from after the start of execution of the data-dependent instruction until the start of execution of the stalled instruction. As a result, the execution results of a data-dependent instruction are available when the stalled instruction is executed, and a stall can be avoided.

The present invention can be executed by hardware or by software using some hardware functions. In the following explanation, the first embodiment is an example of the former, and the second embodiment is an example of the latter.

1st Embodiment

Figure 2A:
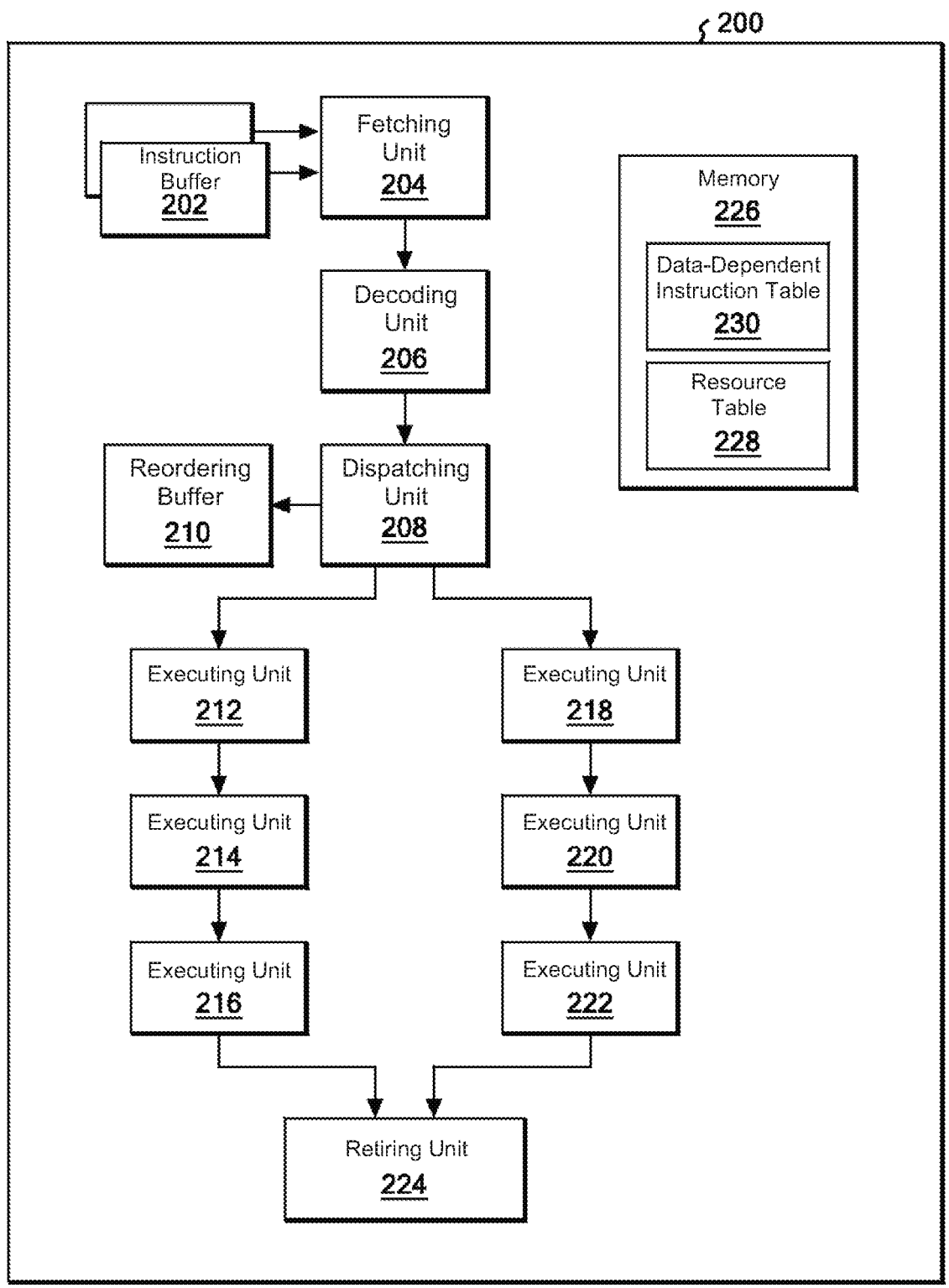
FIG. 2A is a diagram showing the pipeline structure of a processor and its surrounding environment according to an embodiment of the present invention.

FIG. 2A is a diagram showing the pipeline structure of a processor 200 and its surrounding environment according to an embodiment of the present invention. The processor 200 has a simultaneous multithreading function and uses out-of-order execution. The pipeline of the processor 200 includes a fetching unit 204, a decoding unit 206, a dispatching unit 208, executing units 212-222, and a retiring unit 224. In the example shown in FIG. 2A, the pipeline is divided in two, and each execution pipeline has three executing units. However, there are no restrictions on the number of branches and the number of executing units in the pipeline when embodying the present invention. Also, the processor 200 may include other configurational elements not shown in FIG. 2A.

The fetching unit 204 fetches, in accordance with the thread priority, instructions from an instruction buffer 202 prepared for each thread. The thread priority is established based on the priority for processing the instructions and can change depending on the circumstances. The decoding unit 206 decodes the fetched instruction.

The dispatching unit 208 dispatches the decoded instruction to the appropriate executing unit in the order prepared in the register of the processor 200 by all of the data or operands needed in the processing (not shown). The instruction dispatched at this time is registered in the reordering buffer 210 for retirement in the same order as the original program.

A plurality of execution units 212-222 executes the dispatched instructions. More specifically, the executing units 212-222 are load-and-store executing units for loading and storing values from the memory (not shown), and integer operation units for performing addition, subtraction and shifts on the values held by the register (not shown).

The retiring unit 224 writes the final execution results of each instruction to a specific storage area such as a cache or memory (not shown). When the retiring unit 224 ends this processing, the execution of each instruction has been completed, and they are deleted from the reordering buffer 210 mentioned above. However, in some cases additional conditions are imposed on removal from the reordering buffer 210.

The processor 200 in the present embodiment includes memory 226, and a resource table 228 is stored in the memory 226. Pairs of an instruction and resource information of the processor 200 used by the instruction are registered in order (that is, in program order) in the resource table 228 for each resource during execution of the instruction. Each executing unit 212-222 of the processor 200 in the present embodiment detects the occurrence of a stall during instruction processing, identifies any other instruction (second instruction) on which the stalled instruction (first instruction) is data dependent from the data dependencies, and registers this instruction.

Preferably, detection of the occurrence of stalling is performed by detecting either a standby event for inputting an instruction to the pipeline or a cancellation event for pipeline processing. These are hardware events of a performance monitoring unit.

More specifically, when each executing unit 212-222 detects the occurrence of a stall in itself, the resource information (typically, a memory address) used by the first instruction is used as a key to search all entries registered in the resource table 228 prior to an entry for the first instruction and to identify the second instruction. When there is a plurality of identified instructions, the instruction whose registration position in the resource table 228 is closest to the entry for the first instruction is selected. Thus, any second instruction on which the first instruction is data dependent can be identified by accessing the same memory address in the memory accessed by the first instruction, and by finding the instruction closest to the first instruction preceding the first instruction in the program order.

Preferably, the device for reducing stalling further comprises a table for registering pairs of instructions and resource information on the processor used by the instruction in the order each instruction is executed. Each executing unit identifies the second instruction by retrieving the entry registered in the table prior to the first instruction using the resource information of the computer used by the first instruction as the key.

The executing units 212-222 register the identified second instruction. The second instruction may be registered by registering the address of the second instruction in the data-dependent instruction table 230 inside the memory 226, using one bit of the instruction cache line, or a combination of the two. In the combination of the two, information on the second instruction is first stored in the data-dependent instruction table 230, and the second instruction is registered using one bit in the instruction cache line when it has been determined during decoding of the instruction that the decoded instruction matches the instruction registered in the data-dependent table 230.

Preferably, the device registers the second instruction by storing the address in a predetermined table, by using one bit in an instruction cache line, or a combination of these.

Instead of this configuration, the second instruction may be registered by an instruction from the retiring unit 224 on condition that the second instruction was processed normally by the retiring unit 224. In this case, the executing units 212-222 mark the data-dependent instruction when the instruction has been identified. The mark of an identified instruction may be information added to the pipeline, an identified instruction saved to a dedicated register, or an entry marked for the identified instruction in the reordering buffer 210. This is because instructions that are speculatively executed and eventually canceled are eliminated as targets for application of the present invention. However, results can be obtained by applying the present invention even to instructions that are speculatively executed as long as they are instructions that affect other instructions in the pipeline.

The fetching unit 204 of the processor 200 in the present embodiment determines whether an instruction fetched during processing is the registered second instruction. When it has been determined that the instruction is the second instruction, an instruction is inserted to fetch another thread different from the thread currently being processed (referred to below as a "thread-switching instruction"). This is so that the thread switching operation is performed during execution from after the second instruction has been fetched to before the first instruction is fetched. The thread-switching instruction may be realized by an instruction indicating the lowering of the priority of the thread currently being processed (referred to below as a "thread yield instruction"). In the following explanation, a thread yield instruction is used as the thread-switching instruction.

The thread yield instruction inserted by the fetching unit 204 is identified by the decoding unit 206, and the decoding unit 206 instructs the fetching unit 204 to lower the priority of the thread currently being processed. Alternately, the thread yield instruction may be identified by the retiring unit 224, and the retiring unit 224 may instruct the fetching unit 204 to lower the priority of the thread currently being processed.

The insertion position for the thread yield instruction for the fetching unit 204 is a position enabling the fetched thread to be switched sometime after the second instruction has been fetched and before the first instruction is again fetched. More specifically, it is ahead of the first instruction by the number of cycles required from the thread yield instruction fetch until the priority switching occurs. Instead of this method, the fetching unit 204 can determine whether or not an instruction fetched during processing is the registered second instruction. Then, when it has been determined that the instruction is the second instruction, it may be switched to the buffer of another thread that has been prepared for execution directly without having to insert a thread yield instruction.

Figure 2B:
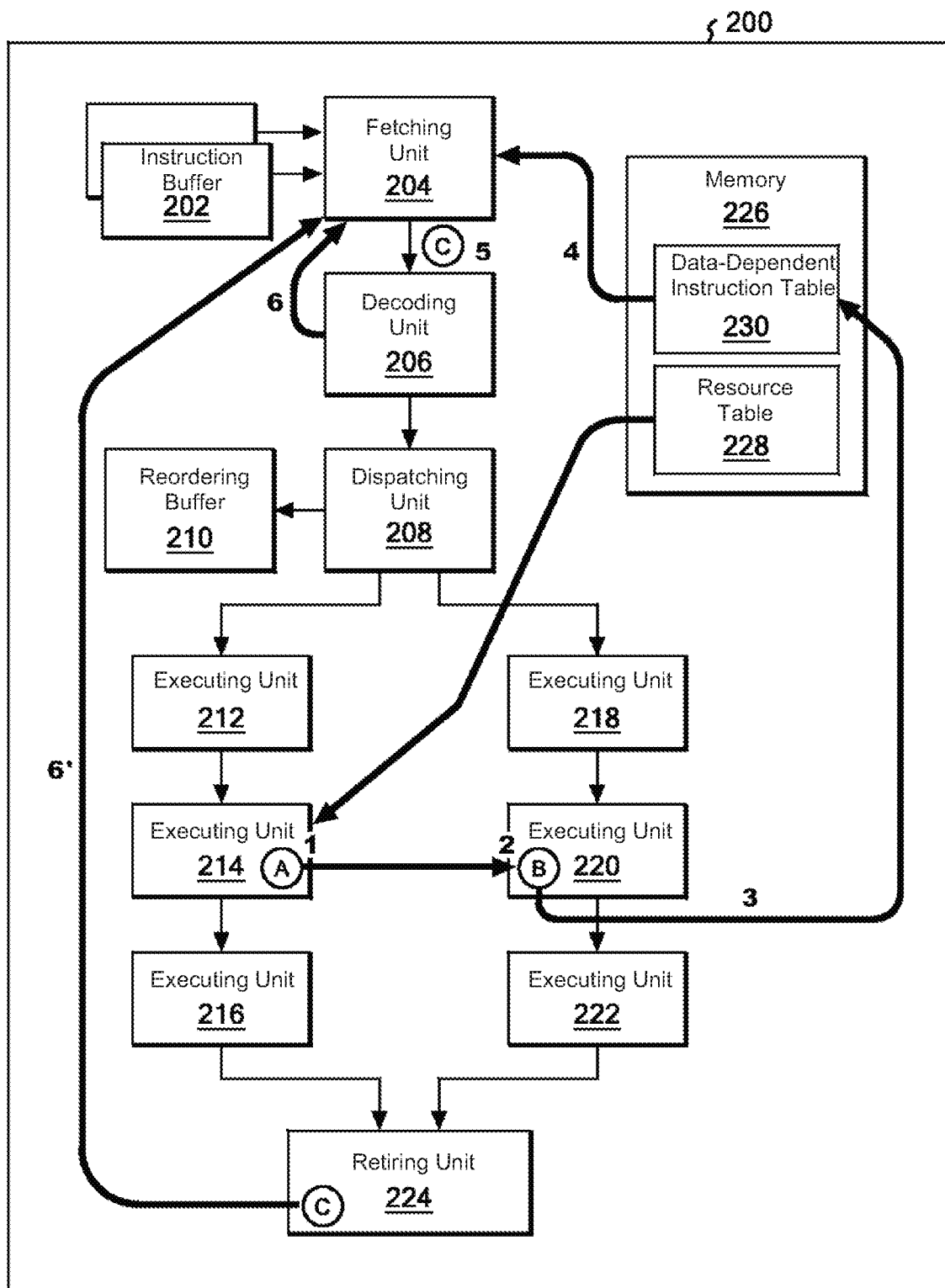
FIG. 2B is a diagram used to explain an example of the operations of each element when stalling occurs in the processor according to an embodiment of the present invention.

The operations performed by the various configurational elements when a stall occurs in the pipeline of this processor 200 will now be explained with reference to FIG. 2B. In the example shown in FIG. 2B, a stall has occurred while executing unit 214 was processing instruction A. The executing unit 214 responds to detection of a stall by referencing resource table 228 (see number 1), identifying another instruction B which is data-dependent instruction A during execution (see number 2), and registers information of the identified instruction B to the data-dependent instruction table 230 (see number 3).

The fetching unit 204 references the data-dependent instruction table 230 and determines whether the fetched instruction is a registered instruction each time another instruction is fetched from the instruction buffer 202 (see number 4). When the fetched instruction is instruction B registered in the data-dependent instruction table 230, the fetching unit 204 inserts a thread yield instruction C to lower the priority of the thread currently being executed in order to switch the thread currently being executed until instruction A has been fetched the next time (see number 5).

When the decoding unit 206 has identified that the decoded instruction is thread yield instruction C, it instructs the fetching unit 204 to lower the priority of the thread currently being executed (see number 6). In response to the decoding unit 206, the fetching unit 204 lowers the priority of the thread being executed. The fetching unit 204 then fetches an instruction from the instruction buffer 202 prepared for each thread in accordance with the updated thread priority. As mentioned above, the instructions for identifying the thread yield instruction C and lowering the priority of the thread currently being executed may also be executed by the retiring unit 224 (see number 6'). When the fetching unit has determined that the fetched instruction matches the instruction registered in the data-dependent instruction table 230, an instruction may be immediately fetched from an instruction buffer for another thread prepared for execution.

Figure 1B:
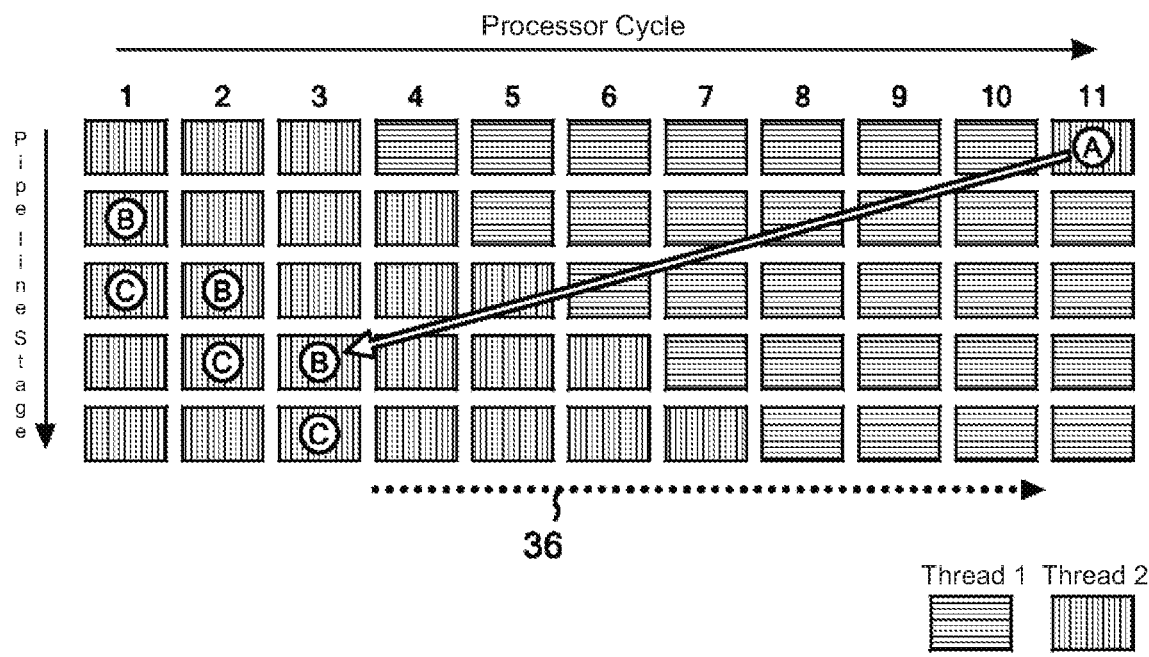
FIG. 1B is a diagram schematically illustrating how stalling is avoided by the present invention.

The results of the present invention will now be explained with reference to FIG. 1B. FIG. 1B is a diagram schematically illustrating how a stall is avoided by using the present invention. As in FIG. 1A, the horizontal axis in FIG. 1B denotes the processor cycles, and the vertical axis denotes each stage in the pipeline of the processor (the processing results of each stage are passed on to the next stage). The blocks with horizontal shading indicate the stages embedded in the instructions of thread 1, and the blocks with vertical shading indicate the stages embedded in the instructions of thread 2. Here, instruction C indicates the thread yield instruction inserted by the fetching unit 204. Instruction B indicates an instruction dependent on data of instruction A in which a stall has previously occurred. It should be understood that, in FIG. 1B, the entire pipeline is shown.

In the example shown in FIG. 1B, the inserted thread yield instruction is processed in the final stage, that is, in the third cycle by the retiring unit 224. At this time, the retiring unit 224 instructs the fetching unit 204 to lower the priority of thread 2 currently being processed. As a result, instruction fetching begins for thread 1 in the fourth cycle.

Preferably, the device for reducing stalling further comprises a retiring unit for writing execution results in a predetermined storage area such as a cache or memory. The second instruction is registered on condition that the processing performed on the second instruction by the retiring unit has been completed normally.

After the fourth cycle, the instruction in thread 2 is not fetched because of the lowering of the priority, and only the instruction in thread 1 is introduced to the pipeline in the next seven cycles as indicated by arrow 36. The priority of thread 2 is restored in the eleventh cycle, and instruction A which stalled previously is fetched. As a result, there is enough of a time interval from the execution (or fetching) of data-dependent instruction B until the fetching of instruction A for a stall to be avoided.

2nd Embodiment

Figure 3:
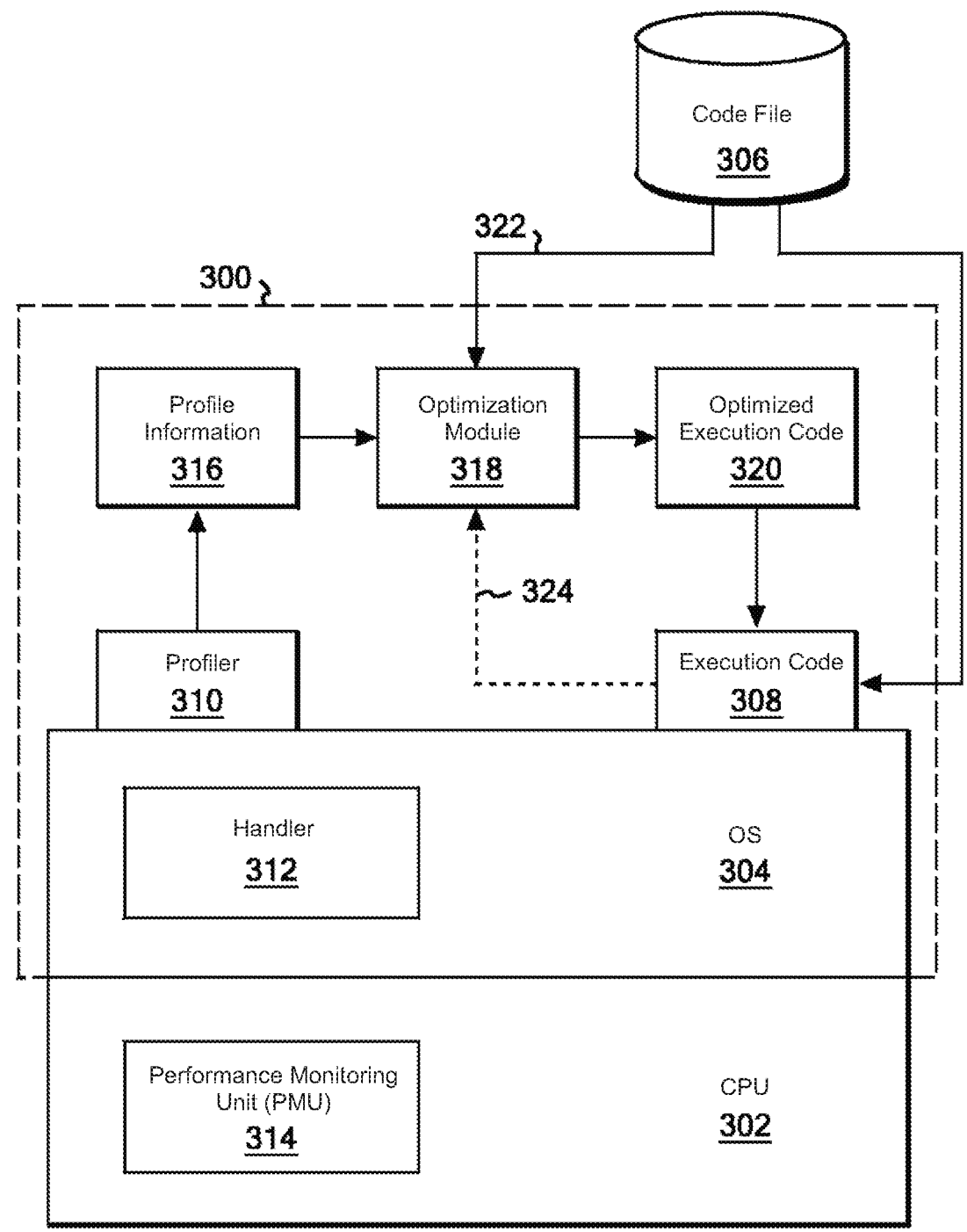
FIG. 3 is a diagram showing the software configuration of a stall reducing program according to an embodiment of the present invention.

FIG. 3 is a diagram showing the software configuration of a stall reducing program 300 according to an embodiment of the present invention. The stall reducing program 300 according to the present embodiment includes a handler 312 which uses hardware functions to detect a stall occurring during the execution of execution code 308 and to identify a second instruction on which the stalled first instruction is data dependent, a profiler 310 which registers the second instruction identified by the handler 312 as profile information 316, and an optimization module 318 for inserting a thread-switching instruction in the appropriate position in the execution code 308 or in the original code file 306 based on the profile information 316 and for outputting the optimized execution code 320. As explained in relation to the first embodiment, the thread-switching instruction may be realized using a thread yield instruction. In the following explanation, a thread yield instruction is used as the thread-switching instruction.

The hardware functions used by the handler 312 are the functions of a performance monitoring unit (PMU) 314 provided by the CPU 302. The PMU 314 monitors for the occurrence of events indicated by behavior inside the CPU 302, counts the occurrence of these events using an internal counter, and performs the indicated processing when the count value reaches a threshold value. Typical objects that are monitored include the number of cycles executed by the CPU 302, the number of instructions executed, the number of mispredicted branches, and the number of data cache mistakes. The CPU 302 is a processor including a simultaneous multithreading function and performs out-of-order execution.

In the present invention, the profiler 310 described below indicates in pre-processing a pipeline instruction insertion standby event and/or a pipeline processing cancellation event to be monitored by the PMU 314. Here, the pipeline processing cancellation event is a cancellation event before the completion of execution or a cancellation event after the completion of execution, that is, an execution result invalidation event. The profiler 310 instructs the PMU 314 to start the handler 312 described below when the number of indicated events reaches a threshold value. When the PMU 314 has activated the handler 312, it reports a pointer to the instruction which caused the indicated event to occur, that is, a pointer to the first instruction which caused the stall.

When started by the PMU 314, the handler 312 loads the first instruction indicated by the reported pointer, decodes the instruction, and, if necessary, acquires the type of instruction, the type of operand and the register number that it uses. The handler 312 uses this information to acquire the identification information for the hardware (HW) resources accessed by the first instruction to be described below. The handler 312 identifies a second instruction on which the first instruction is data dependent by setting one previous instruction as the subsequently analyzed object with the first instruction as the starting point in the executed code 308 currently being executed, and by analyzing a predetermined number of instructions within a certain range of the first instruction. Because a stall has occurred, the second instruction on which the first instruction is data dependent is considered to be prior to the first instruction and near the first instruction in the execution code 308. Therefore, the predetermined number of 10-20 instructions is sufficient.

Preferably, identification of the second instruction is performed by setting a previous instruction as an object to be analyzed in sequential order with the first instruction in the executed program serving as the starting point, and analyzing a predetermined number of instructions within a certain range from first instruction.

The handler 312 sets the return instruction of the called up function as the current object to be analyzed when the current object to be analyzed is a call instruction. The handler 312 sets the corresponding branch source instruction as the current object to be analyzed when the current object to be analyzed is a branch target. The handler 312 sets a call instruction examining a call stack and calling up a function as the current object to be examined when the current object to be analyzed is the start of the function.

Preferably, the return instruction of the called up function is set as the current object to be analyzed when the current object to be analyzed is a call instruction, the corresponding branch source instruction is set as the current object to be analyzed when the current object to be analyzed is a branch target, and a call instruction examining a call stack and calling up a function is set as the current object to be examined when the current object to be analyzed is the start of the function.

Next, the handler 312 performs an analysis to determine whether or not the current object to be analyzed is a second instruction in which there is data dependence. First, the handler 312 acquires, from the PMU 314, identification information for the hardware (HW) resource accessed by the first instruction, and the type of data dependency. Here, the type of data dependency is the order of the two access methods used on the same hardware (HW) resource, for example, (Write, Read), (Read, Write), (Write, Write), and (Read, Read). The format is (first access method, second access method), and the first access is performed by the second instruction, and the second access is performed by the first instruction. The handler 312 decodes the instruction of the current object to be analyzed, and determines whether or not the instruction accesses the same hardware (HW) resource as the hardware (HW) resource accessed by the first instruction, and whether or not the access method matches the first access method of the data dependency. When these conditions are satisfied, the current object to be analyzed is a second instruction. When the conditions are not satisfied, the current object to be analyzed is not a second instruction. The hardware (HW) resource can be a register, cache, memory, executing unit, or control unit.

When a second instruction has been identified, the handler 312 reports information on the second instruction to the profiler 310.

When the profiler 310 receives information on the second instruction from the handler 312, the information is registered as profile information 316. Notification of the second instruction may occur paired with the first instruction, or the profiler 310 may determine the pairing based on statistical information such as frequency of notification and register the pair. The information on the second instruction may be address information on the instruction or other position information on the second instruction in the execution code 308 or the original code file 306.

The optimization module 318 references the profile information 316, and inserts a thread yield instruction to lower the priority of the thread being executed in the appropriate location in the execution code 308 or the original code file 306. The thread yield instruction may be inserted on condition that the statistical information on the pairing of the first instruction and the second instruction exceeds a threshold value. The appropriate location for insertion of the thread yield instruction is where the thread to be fetched can be switched in the period after the second instruction has been fetched and before the first instruction has been fetched the next time.

Whether the thread yield instruction can be treated statically or dynamically depends on whether the execution code 308 is static or can be changed dynamically, that is, whether or not the execution code 308 can be reconfigured. The optimization process for the former will be explained with reference to FIG. 4A, and the optimization process for the latter will be explained with reference to FIG. 4B and FIG. 4C.

Preferably, a second instruction is paired with the first instruction and registered, the number of registrations is counted, and the insertion of an instruction instructing the fetching of the other thread is executed with respect to a pair in which the counted number of registrations has exceeded a threshold value.

Figure 4A:
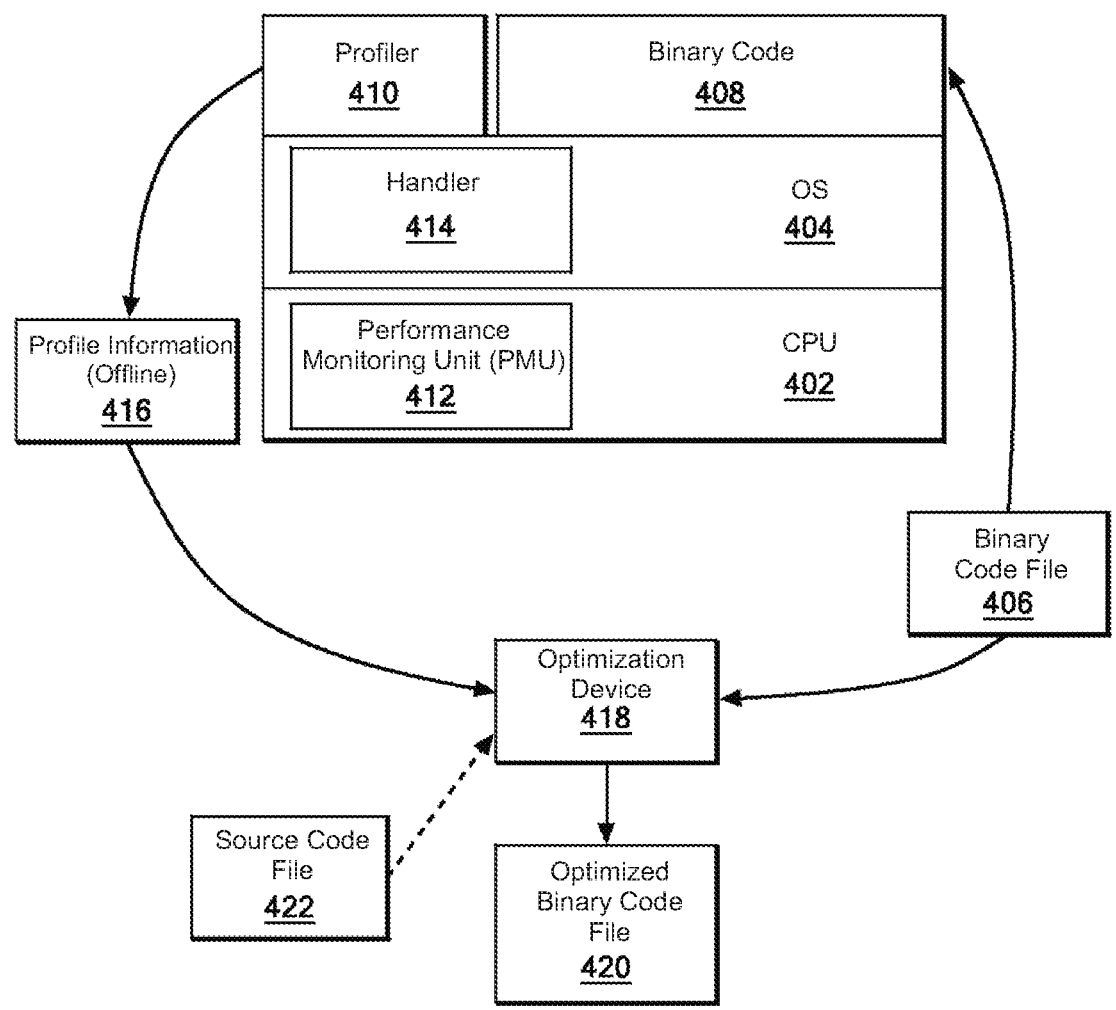
FIG. 4A is a diagram used to explain the software configuration of a stall reducing program according to an embodiment of the present invention when the program to be executed is offline.

FIG. 4A is a diagram used to explain the software configuration of a stall reducing program according to an embodiment of the present invention when the execution code 308 is offline. Because the CPU 402, PMU 412, OS 404, handler 414 and profiler 410 are no different from those explained with reference to FIG. 3, further explanation has been omitted. The execution code 308 exists as binary code 408, and the optimization device 418 (corresponding to the optimization module 318) converts the binary code files 406 offline, references the profile information 416, and inserts a thread yield instruction in the appropriate location. The optimization device 418 outputs the binary code file including the inserted thread yield instruction as binary code file 420.

When there is a source code file 422 for the binary code 408, the optimization device 418 references the profile information 416 when the source code file 422 is converted to binary code, inserts a thread yield instruction when it has been determined that there is a location for insertion of a thread yield instruction, and outputs an optimized binary code file 420.

Figure 4B:
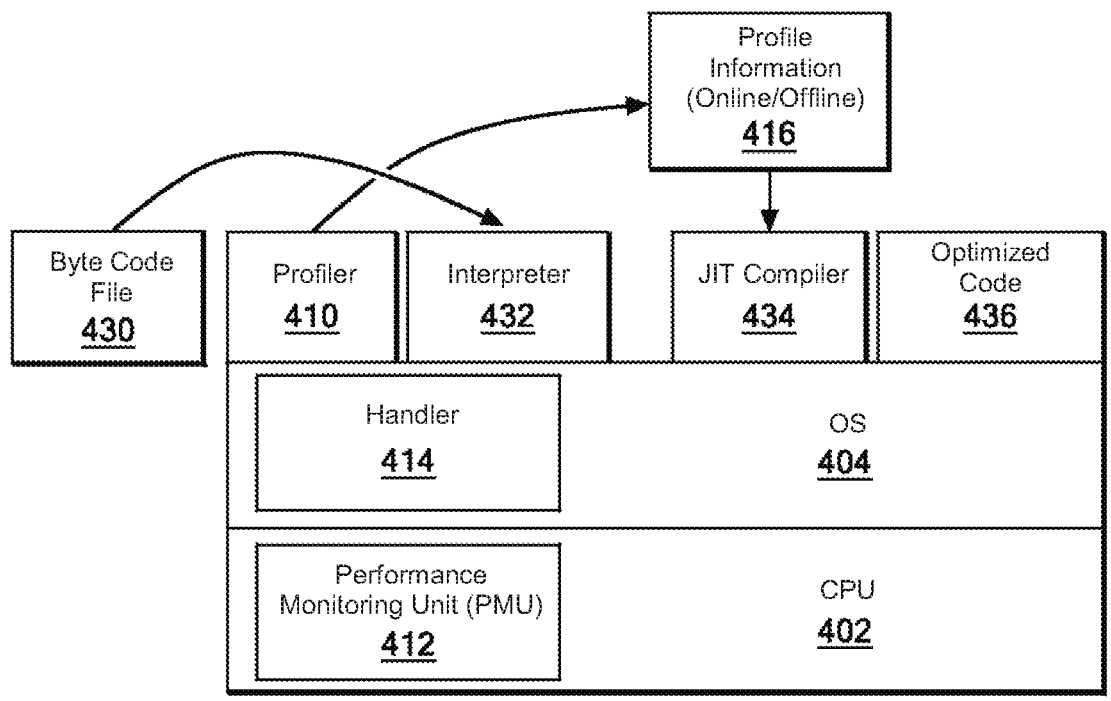
FIG. 4B is a diagram used to explain an example of a software configuration for a stall reducing program according to an embodiment of the present invention when the program to be executed is changed dynamically.

FIG. 4B is a diagram used to explain an example of a software configuration for a stall reducing program according to an embodiment of the present invention when the program to be executed is changed dynamically. Because the CPU 402, PMU 412, OS 404, handler 414 and profiler 410 are no different from those explained with reference to FIG. 3, further explanation has been omitted. The execution code 308 exists as a binary code file 430, which is successively interpreted by the interpreter 432. The binary code with a high execution frequency is converted to binary code by a JIT compiler 434, and directly executed by the CPU. The JIT compiler 434 (corresponding to the optimization module 318) references the profile information 416, inserts a dynamically recompiled thread yield instruction when it has been determined that there is an appropriate location for thread yield insertion in the compiled binary code, and outputs optimized code 436.

Figure 4C:
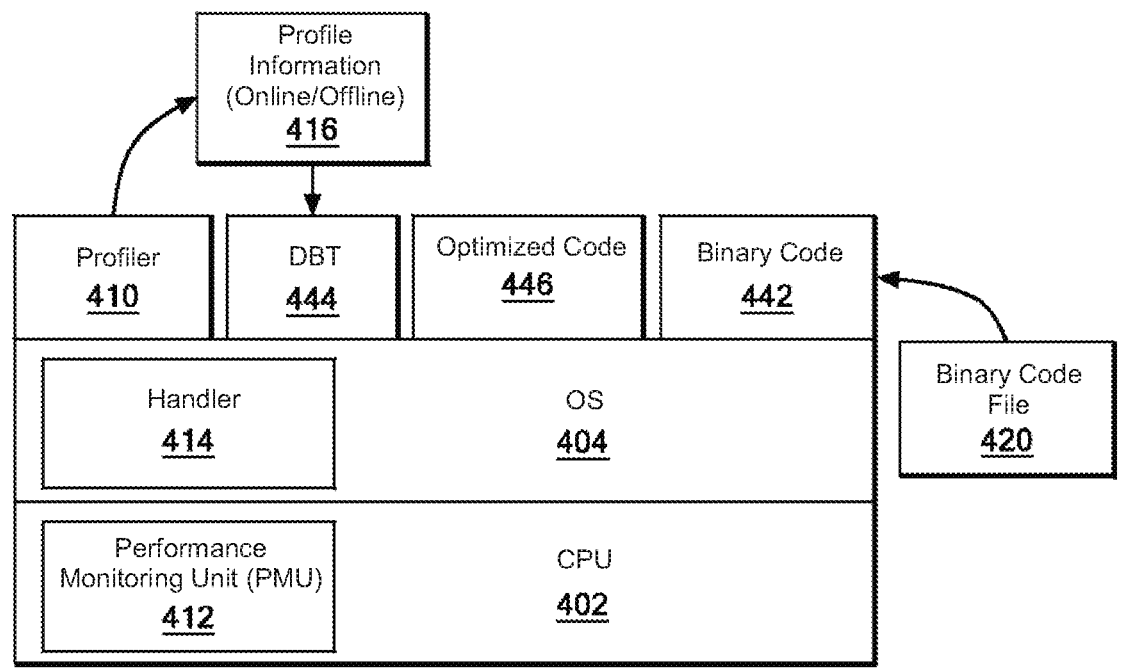
FIG. 4C is a diagram used to explain an example of a software configuration for a stall reducing program according to an embodiment of the present invention when the program to be executed is changed dynamically.

FIG. 4C is a diagram used to explain an example of a software configuration for a stall reducing program according to an embodiment of the present invention when the program to be executed is changed dynamically. Because the CPU 402, PMU 412, OS 404, handler 414 and profiler 410 are no different from those explained with reference to FIG. 3, further explanation has been omitted. The execution code 308 exists as binary code 442, and a dynamic binary translator (DBT) 444 converts the binary code 442 to executable binary for the current environment when executed. The DBT 444 (corresponding to the optimization module 318) references the profile information 416, inserts and performs binary conversion on a thread yield instruction when it has been determined that there is an appropriate location for insertion of a thread yield instruction in the portion of the binary code to be executed next, and outputs optimized code 446.

Preferably, the instruction instructing the fetching of the other thread is executed by an instruction lowering the priority of the thread being executed, or is inserted dynamically or statically in front of the first instruction via binary conversion or recompiling.

Figure 5:
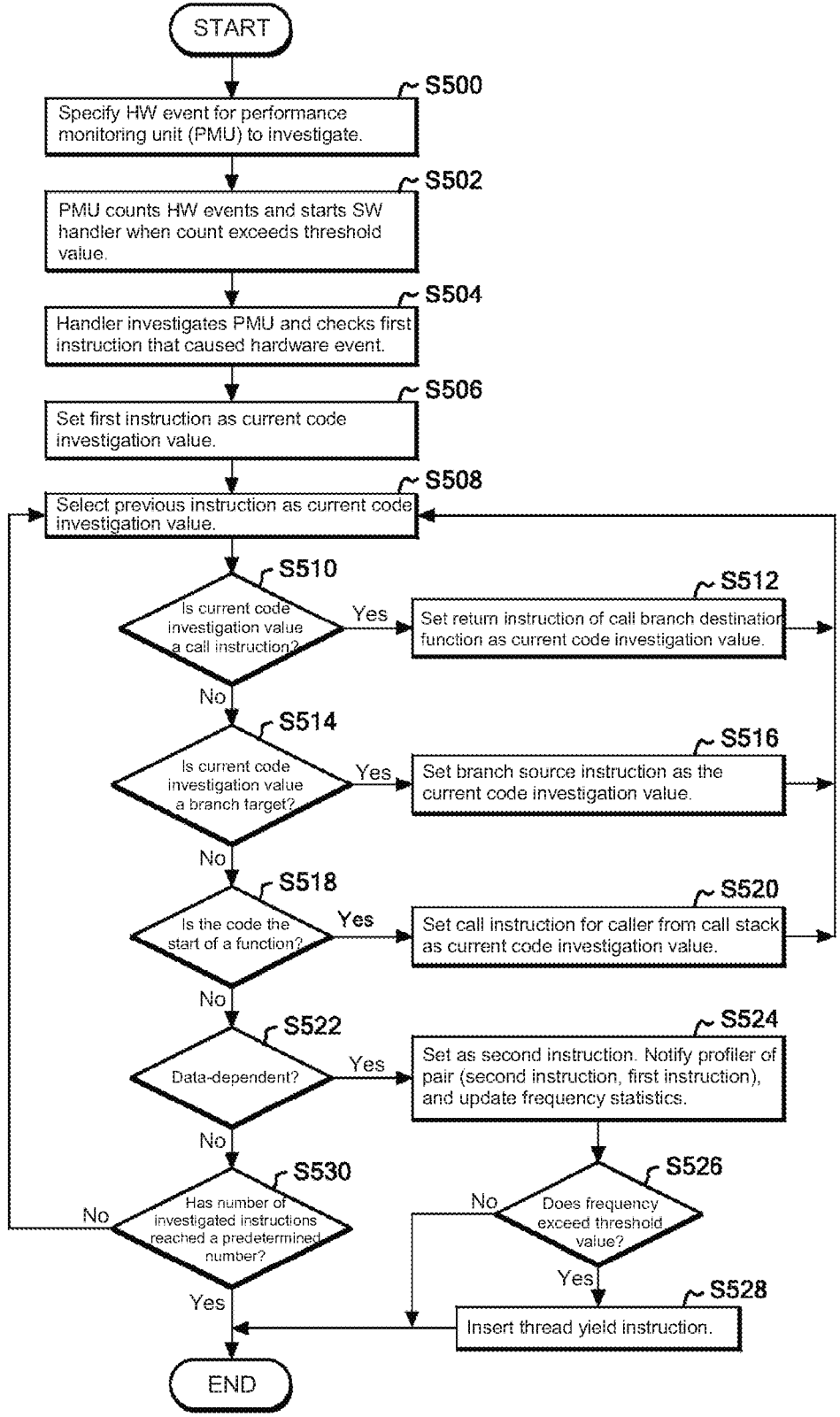
FIG. 5 is an example of the operational flow in a stall reducing process according to an embodiment of the present invention.

The stall reducing process performed by the stall reducing program 300 of the present embodiment will now be explained with reference to FIG. 5. FIG. 5 is an example of the operational flow in a stall reducing process according to an embodiment of the present invention.

In the stall reducing process shown in FIG. 5, the process starts at Step 500 in which the profiler 310 specifies a pipeline instruction input standby event or a pipeline process cancellation event as the hardware event for the PMU 314 to investigate. The PMU 314 counts the number of specified hardware events, and starts the handler 312 specified by the profiler 310 when the count exceeds a threshold value (Step 502). The started handler 312 then obtains the first instruction that caused the specified hardware event by investigating the PMU 314 (Step 504).

Then, the handler 312 sets the acquired first instruction as a current code analysis value (Step 506). Then, the handler 312 sets the previous instruction as a new current code analysis value with the current code analysis value serving as a starting point in the execution code 308 (Step 508). Then, the handler 312 determines whether or not the current code analysis value is a call instruction (Step 510). When the current code analysis value is a call instruction (Step 510: YES), the handler 312 sets a return instruction of a branch function of the call instruction as the current code analysis value (Step 512), and the process returns to Step 508. When the call instruction branch destination cannot be analyzed statically, profiles of a commonly used call branch tree are collected to determine a most likely branch destination.

When the current code analysis value is not a call instruction (Step 510: NO), the handler 312 determines whether the current code analysis value is a branch target (Step 514).

When the current code analysis value is a branch target (Step 514: YES), the handler 312 sets the branch source instruction as the new current code analysis value (Step 516), and the process returns to Step 508. When the branch source cannot be analyzed statically, the profiles of a commonly used call branch tree are collected to determine the most likely branch source.

When the current code analysis value is a branch target (Step 514: NO), the handler 312 determines whether or not the current code analysis value is the start of a function (Step 518). When the current code analysis value is the start of a function (Step 518: YES), the handler 312 investigates the call stack and sets the call instruction calling up the function as the current object to be analyzed (Step 520), and returns the process to Step 508.

When the current code analysis value is not the start of a function (Step 518: NO), the handler 312 determines whether or not the current code analysis value is a second instruction on which the first instruction is data-dependent (Step 522). When the current code analysis value is a second instruction (Step 522: YES), the handler 312 identifies the current code analysis value as the second instruction, notifies the profiler 310 of the paired second instruction and first instruction, and updates the frequency information for the pair (Step 524).

Next, the process proceeds from Step 524 to Step 526. In response to the profiler 310 updating the profile information, the optimization module 318 determines if the frequency of the pair comprising the second instruction and the first instruction exceeds a threshold value. If the threshold value is exceeded (Step 526: YES), the optimization module 318 references the profile information, and a thread yield instruction lowering the priority of the thread being executed is inserted in an appropriate location in the execution code 308 or the original code file 306 (Step 528). If the threshold value is not exceeded (Step 526: NO), the process ends.

Preferably, the fetching unit responds to a match between the instruction fetched from the buffer of the thread being executed and the registered second instruction by switching the buffer to be fetched to the buffer of another thread ready to be executed. Alternately, the fetching unit responds to a match between the instruction fetched from the buffer of the thread being executed and the registered second instruction by inserting an instruction to lower the priority of the thread being executed.

When the current code analysis value is not a second instruction in Step 522 (Step 522: NO), the handler 312 determines whether or not the number of analyzed instructions has reached a predetermined number (for example, a number between 10 and 20) (Step 530). When the number of analyzed instructions has not reached the predetermined number (Step 530: NO), the process returns to Step 508. When the number of analyzed instructions has reached the predetermined number (Step 526: YES), the process ends.

Figure 6:
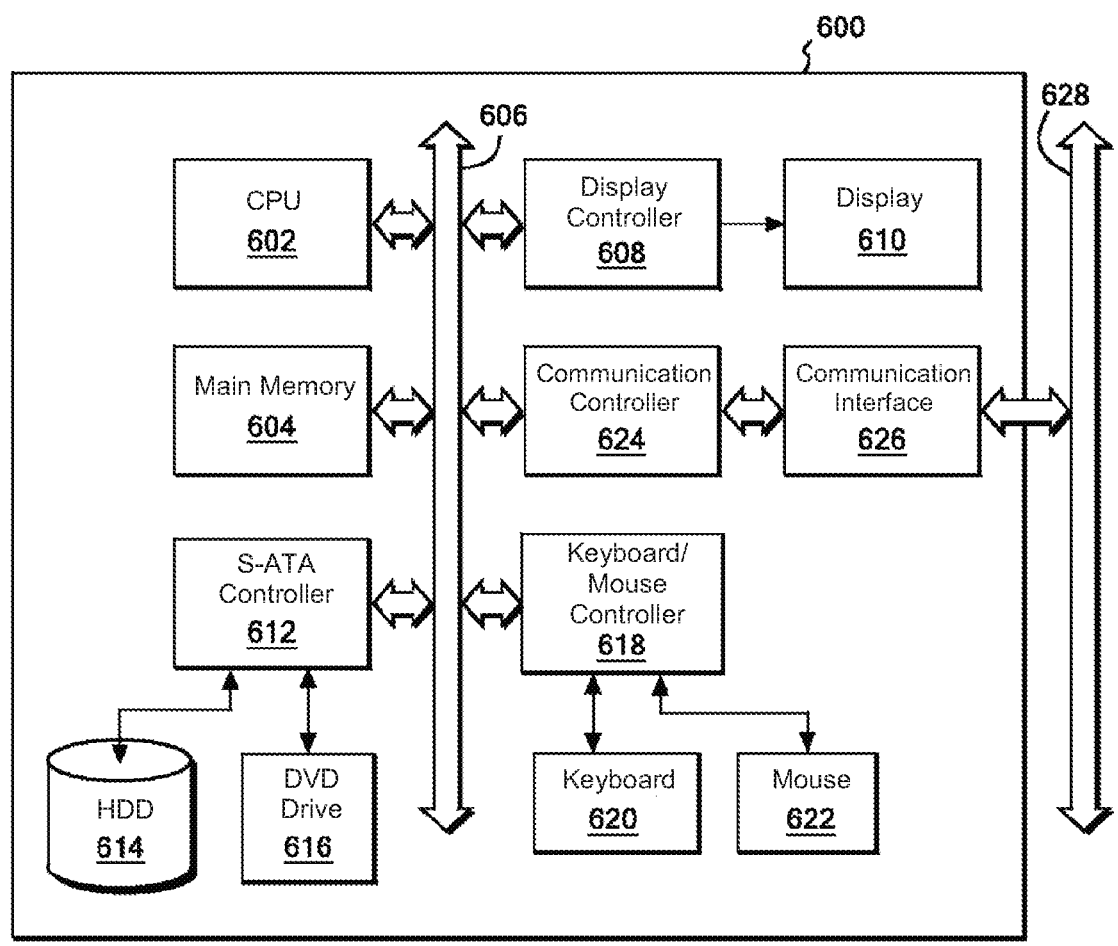
FIG. 6 is an example of a hardware configuration of a computer system 600 according to an embodiment of the present invention.

FIG. 6 is an example of a hardware configuration of a computer system 600 according to an embodiment of the present invention. The computer 600 includes a CPU 602 and a main memory 604, and these are connected to a bus 606. The CPU 602 has a simultaneous multithreading function and uses out-of-order execution. The Power™ series from International Business Machines Corporation or the Core™ series from Intel may be used. A display 610 such as a liquid crystal display (LCD) may be connected to the bus 606 via the display controller 608. The display 610 is used to display, using the appropriate graphics interface, information on computers connected to the network via the communication line, and information on the software operating on the computer in order to operate the computer.

A disk 614 such as a silicon disk or a hard disk may be connected to the bus 606 via a SATA or IDE controller 612. Also, a drive 616 such as a CD, DVD or BD drive may be connected to the bus 606 via a SATA or IDE controller 612. In addition, a keyboard 620 and mouse 622 may be connected to the bus 606 via a keyboard/mouse controller 618 or USB bus (not shown). However, these are not needed to embody the present invention.

An operating system, the stall reducing program 300 of the present embodiment, and other programs and data are stored in a disk 614 for potential loading into the main memory 604. The operating system may be Linux®, the Windows® operating system from Microsoft Corporation, MacOS® or iOS® from Apple Computer, Inc., or a Unix® system equipped with X Window System, such as AIX® from International Business Machines Corporation. If necessary, a drive 616 may be used to install a program on the disk 614 from a CD-ROM, DVD-ROM or BD.

The communication interface 626 may be according to the Ethernet® protocol. The communication interface 626 is connected to the bus 606 via a communication controller 624, which physically connects the computer 600 to the communication line 628, and provides a network interface layer for the TCP/IP communication protocol of the communication function of the operating system of the computer 600. The communication line may be based on a wired LAN environment or based on a wireless LAN environment, for example, a Wi-Fi standard such as IEEE 802.11a/b/g/n.

It should be understood that the computer 600 used in the embodiments of the present invention is not restricted to a particular operating system environment. Also, all of the configurational elements explained above are not necessarily essential configurational elements of the present invention.

The present invention was explained using embodiments, but the technical scope of the present invention is not limited to the embodiments described above. The possibility of many changes and improvements to this embodiment should be apparent to those skilled in the art. Embodiments including these changes and improvements are within the technical scope of the present invention, as should be clear from the description above.

The order of execution for operations, steps and action in the devices, systems, programs and methods described in the claims, description and drawings was described using such terms as "previous" and "prior". However, these operations, steps and actions can be realized in any order as long as the output of the previous process is used by the subsequent process. Even when the output of a previous process is used in subsequent processing, other processing may be inserted between the previous processing and the subsequent processing, or the processing may be changed so that the previous processing is inserted immediately before the subsequent processing even when another process is described as being inserted between them. The operational flow in the claims, description and drawings were explained using terms such as "first", "next" and "then" for the sake of convenience. The operational flow does not necessarily have to be executed in this order.

What is claimed is:

1. A system, comprising:
a processor having a simultaneous multithreading function for out-of-order execution; and
an adaptive means for executing the steps of:
detecting occurrence of stalling,
identifying, based on data dependency, whether there is a second instruction on which a stalled first instruction is data dependent, wherein the second instruction is identified by accessing a same memory address in a memory accessed by the first instruction, and identifying an instruction closest to the first instruction preceding the first instruction in program order,
registering the second instruction, and
inserting a thread-switching instruction instructing fetching of an instruction from a thread different from a thread being executed with respect to subsequent executions of the second instruction so the thread being executed is switched after the second instruction has been fetched and before the fetching of the stalled first instruction, wherein an insertion position for the thread-switching instruction is ahead of the first stalled instruction by a number of cycles required from the thread-switching instruction fetch until priority switching occurs,
wherein the second instruction is paired with the first instruction and registered, a number of registrations is counted, and insertion of the thread-switching instruction is executed with respect to a pair for which the counted number of registrations has exceeded a threshold value, and
wherein the thread-switching instruction is inserted dynamically or statically between the second instruction and the first instruction via binary conversion or recompiling.

2. A computer program product for reducing occurrence of stalling in a pipeline of a processor having a simultaneous multithreading function, the computer program product comprising:
a non-transitory computer-readable medium; and
computer program instructions for executing of the steps of:
detecting occurrence of stalling;
identifying, based on data dependency, whether there is a second instruction on which a stalled instruction is data dependent, wherein the second instruction is identified by accessing a same memory address in a memory accessed by the stalled instruction, and identifying an instruction closest to the stalled instruction preceding the stalled instruction in program order;
registering the second instruction; and
inserting a thread yield instruction for fetching of an instruction from another thread different from a thread being executed with respect to subsequent executions of the second instruction so the thread being executed is switched after the second instruction has been fetched and before the fetching of the stalled instruction, wherein an insertion position for the thread yield instruction is ahead of the stalled instruction by a number of cycles required from the thread yield instruction fetch until priority switching occurs,
wherein identification of the second instruction is performed by setting a previous instruction as an object to be analyzed in sequential order with the first instruction in an executed program serving as a starting point, and analyzing a predetermined number of instructions within a certain range of the first instruction,
wherein if a current object to be analyzed is a call instruction, a return instruction of a called function is set as the current object to be analyzed, if the current object to be analyzed is a branch target, a corresponding branch source instruction is set as the current object to be analyzed, and if the current object to be analyzed is a start of the function, a calling instruction found by examining a call stack is set as the current object to be analyzed, and wherein the second instruction is paired with the first instruction and registered, a number of registrations is counted, and insertion of an instruction instructing fetching of an instruction from the other thread is executed with respect to a pair for which the counted number of registrations has exceeded a threshold value.

3. A method for reducing stalling in a pipeline of a processor, comprising:

specifying one of a pipeline instruction input standby event and a pipeline process cancellation event as a specified hardware event for a performance monitoring unit to investigate;

counting a number of specified hardware events, and starting a software handler when the number of specified hardware events exceeds a threshold value, wherein the software handler:

acquires a stalled instruction that caused a specified hardware event, sets the acquired stalled instruction as a first current code analysis value, sets a previous instruction as a current code analysis value with the first current code analysis value serving as a starting point in execution code, determines whether the current code analysis value is a call instruction, and if so, sets a return destination of the call instruction as the current code analysis value, and if not so, determines whether the current code analysis value is a branch target, when the current code analysis value is a branch target, sets a branch source instruction as the current code analysis value, when the current code analysis value is not a branch target, determines whether the current code analysis value is a start of a function, when the current code analysis value is the start of a function, investigates a call stack and sets a call instruction that calls the function as the current code analysis value, and when the current code analysis value is not the start of a function, determines whether the current code analysis value is a second instruction on which the stalled instruction is data-dependent, and, if so, updates frequency information for a pair consisting of the second instruction and the stalled instruction; and an optimization module determining whether the frequency information of the pair exceeds a threshold value, and, if so, inserting, at an appropriate location in the execution code, a thread yield instruction lowering priority of a thread being executed.

4. The method for reducing stalling in a pipeline of a processor of claim 3, wherein the appropriate location is a position in the execution code such that a thread to be fetched can be switched within a period after the second instruction has been fetched and before the stalled instruction has been fetched a next time.

5. The method for reducing stalling in a pipeline of a processor of claim 3, wherein the appropriate location is a position in the execution code that is ahead of the stalled instruction by a number of cycles required from a thread yield instruction fetch until priority switching occurs.

* * * * *